(12) United States Patent
Estrella (10) Patent No.: US 12,063,073 B2
(45) Date of Patent: Aug. 13, 2024

(54) SYSTEM AND METHOD FOR EXTERNAL WAVELENGTH CONTROL OF OPTICAL MODULATORS

(71) Applicant: Freedom Photonics LLC, Goleta, CA (US)

(72) Inventor: Steven Brian Estrella, Santa Barbara, CA (US)

(73) Assignee: Freedom Photonics LLC, Goleta, CA (US)

(*) Notice: Subject to any disclaimer, the term of this patent is extended or adjusted under 35 U.S.C. 154(b) by 0 days.

(21) Appl. No.: 17/656,193

(22) Filed: Mar. 23, 2022

(65) Prior Publication Data

US 2022/0311520 A1 Sep. 29, 2022

Related U.S. Application Data

(60) Provisional application No. 63/166,189, filed on Mar. 25, 2021.

(51) Int. Cl.
*H04B 10/572* (2013.01)
*H04B 10/50* (2013.01)

(52) U.S. Cl.
CPC ......... *H04B 10/572* (2013.01); *H04B 10/503* (2013.01)

(58) Field of Classification Search
CPC ............ H04B 10/572; H04B 10/503; H04B 10/50575; H04B 10/564; H04B 10/50; H04B 10/505; H04B 10/5057; H04B 10/50572; H04B 10/506; H04B 2210/006; H04B 10/801; G02B 6/29338; G02B 6/2934; G02B 6/29341; G02B 6/29343; G02B 6/29395; H01S 5/0265; H01S 5/4087

See application file for complete search history.

(56) References Cited

U.S. PATENT DOCUMENTS

| | | |
|---|---|---|
| 7,327,911 B2 | 2/2008 | Piede et al. |
| 7,680,364 B2 | 3/2010 | Nilsson et al. |
| 7,977,622 B2 | 7/2011 | McLaren et al. |
| 8,519,803 B2 | 8/2013 | McLaren et al. |
| 9,310,562 B2 | 4/2016 | Zheng et al. |
| 9,348,154 B2 | 5/2016 | Hayakawa |
| 9,425,899 B2 | 8/2016 | Sekiguchi |
| 9,831,360 B2 | 11/2017 | Knights et al. |

(Continued)

OTHER PUBLICATIONS

Estrella, Steven, et al. "High-Speed Optical Interconnect for Cryogenically Cooled Focal Plane Arrays." Government Microcircuit Applications & Critical Technology (GOMACTech) Conference, 18.1, 2019.

(Continued)

*Primary Examiner* — Hibret A Woldekidan
(74) *Attorney, Agent, or Firm* — KNOBBE, MARTENS, OLSON & BEAR, LLP (57) ABSTRACT

Various designs of optical interconnects and optical links may comprise one or more optically resonant electro-optical modulators used to modulate one or more optical carriers received from one or more lasers using one or more electronic input signals. A wavelength of each laser may be dynamically tuned using a control signal generated by a feedback control system to stabilize the electro-optical modulation of the optical carriers.

22 Claims, 5 Drawing Sheets

(56) References Cited

U.S. PATENT DOCUMENTS

| | | | |
|---|---|---|---|
| 9,983,420 B2 | 5/2018 | Amberg et al. | |
| 10,215,925 B1 | 2/2019 | Knights et al. | |
| 10,224,695 B2 | 3/2019 | Fang et al. | |
| 10,700,492 B2* | 6/2020 | Idjadi | H01S 5/021 |
| 2009/0263137 A1* | 10/2009 | Hossein-Zadeh | H04B 1/30 |
| | | | 398/115 |
| 2010/0254717 A1* | 10/2010 | Miller | H04B 10/564 |
| | | | 398/195 |
| 2011/0206384 A1* | 8/2011 | Zhou | H04B 10/572 |
| | | | 398/192 |
| 2017/0261692 A1* | 9/2017 | Knights | G02B 6/12007 |

OTHER PUBLICATIONS

Kim, Min-Hyeong, Lars Zimmermann, and Woo-Young Choi. "A Temperature Controller IC for Maximizing Si Micro-Ring Modulator Optical Modulation Amplitude." Journal of Lightwave Technology 37.4 (2019): 1200-1206.

Kim, Minkyu, et al. "A Fully Integrated 25 Gb/s Si Ring Modulator Transmitter with a Temperature Controller." 2020 Optical Fiber Communications Conference and Exhibition (OFC). IEEE, 2020.

Peserico, N., et al. "System for tracking femtometer resonance shifts of silicon photonics microring resonator by locking tunable laser." Integrated Optics: Devices, Materials, and Technologies XXII. vol. 10535. International Society for Optics and Photonics, 2018.

* cited by examiner

SYSTEM AND METHOD FOR EXTERNAL WAVELENGTH CONTROL OF OPTICAL MODULATORS

INCORPORATION BY REFERENCE TO ANY PRIORITY APPLICATIONS

This application claims the benefit of priority of U.S. Provisional Application No. 63/166,189 titled "System and Method for External Wavelength Control of Optical Modulators", which was filed on Mar. 25, 2021, the entire disclosure of which is expressly incorporated herein by reference.

STATEMENT REGARDING FEDERALLY SPONSORED RESEARCH OR DEVELOPMENT

This invention was made with U.S. Government support under Contract No. W911NF-18-C-0096, awarded by the United States Army. The Government has certain rights in the invention.

BACKGROUND

Field of the Invention

Various embodiments of this application relate to the field of optical communication links and optical interconnects based on external modulation. More particularly optical communication links and optical interconnects that use optically resonant electro-optical modulators.

Description of the Related Art

Electro-optical modulators are devices widely used in telecommunications, sensing, test and measurement, as well as other applications. In most applications, stability and efficiency of the electro-optical modulation provided by an electro-optic modulator are desired for obtaining a high signal-to-noise ratio, large extinction ratio, and high quality data transmission by the corresponding communication system. Additionally, most applications call for high sensitivity electro-optical modulation to reduce power consumption of the system. Stable and high sensitivity electro-optical modulation are particularly important for low power and low error data transmission over optical communication links. Accordingly, it would be advantageous to develop methods for enabling stable electro-optical modulation with high sensitivity electrical-to-optical conversion.

SUMMARY

A variety of semiconductor lasers designs are disclosed herein. Some such design are capable of providing high optical power and single mode operation.

Example embodiments described herein have several features, no single one of which is indispensable or solely responsible for their desirable attributes. A variety of example systems and methods are provided below.

Example 1: An optical communication system comprising:
 a wavelength tunable laser configured to generate an optical carrier;
 an electro-optical modulator configured to receive the optical carrier from the wavelength tunable laser, receive an electronic input signal, and generate a modulated optical carrier having a modulation amplitude using the optical carrier and electronic input signal;
 a photoreceiver configured to receive the modulated optical carrier and generate a detected electronic signal associated with the modulation amplitude of the modulated optical carrier; and
 a control system configured to receive the detected electronic signal and generate a control signal based at least in part on the detected electronic signal and feed the control signal to the wavelength tunable laser to alter a wavelength of the optical carrier generated by the wavelength tunable laser.

Example 2: The optical communication system of Example 1, wherein the electro-optical modulator comprises an optically resonant electro-optical modulator.

Example 3: The optical communication system of Example 2, wherein the optically resonant electro-optical modulator comprises a ring resonator modulator (RRM).

Example 4: The optical communication system of Example 1, wherein the control system is configured to generate the control signal based at least in part on an RF power of the detected electronic signal.

Example 5: The optical communication system of Example 4, wherein the control signal is configured to alter the wavelength of the optical carrier generated by the wavelength tunable laser to maintain the RF power of the detected electronic signal above a threshold RF power.

Example 6: The optical communication system of Example 4, wherein the control signal is configured to alter the wavelength of the optical carrier generated by the wavelength tunable laser to maintain the RF power to within a tolerance of a target RF power.

Example 7: The optical communication system of Example 1, wherein the control system configured to receive a reference signal and generate the control signal based at least in part on the reference signal.

Example 8: The optical communication system of Example 1, wherein the control system is configured to generate the control signal based at least in part on reference data stored in a memory of the control system.

Example 9: The optical communication system of Example 1, wherein the control system comprises a signal processing system and a monitoring circuit.

Example 10: The optical communication system of Example 9, wherein the signal processing system comprises an analog-to-digital converter configured to digitize the detected electronic signal and a decision logic circuit configured to generate the control signal based at least in part on the digitized detected electronic signal.

Example 11: The optical communication system of Example 9, wherein the monitoring circuit comprises an RF power detector or an RF power meter.

Example 12: The optical communication system of Example 1, further comprising:
 a first optical link configured to transmit the optical carrier from the laser to the electro-optical modulator, and
 a second optical link configured to transmit the modulated optical carrier from the electro-optical modulator to the photoreceiver.

Example 13: The optical communication system of Example 12, wherein at least one of the first and the second optical links comprise on-chip optical waveguides.

Example 14: The optical communication system of Example 12, wherein at least one of the first and the second optical links comprise optical fiber links.

Example 15: The optical communication system of Example 1, wherein the tunable laser, and the photoreceiver are separated from the optical modulator by a distance in a range from 1 centimeter to 10 centimeters.

Example 16: The optical communication system of Example 1, wherein the tunable laser, and the photoreceiver are separated from the optical modulator by a distance in a range from 0.1 meter to 10 kilometers.

Example 17: The optical communication system of Example 1, wherein the optical carrier has a wavelength in a range from 1200 nm to 1650 nm.

Example 18: The optical communication system of Example 1, wherein the wavelength tunable laser is a semiconductor laser.

Example 19: The optical communication system of Example 18, wherein the wavelength tunable laser comprises a distributed feedback (DFB) laser, a distributed Bragg reflector (DBR) laser, a vertical cavity surface-emitting laser (VCSEL), an external cavity laser (ECL), or a ring laser.

Example 20: The optical communication system of Example 1, wherein the modulated optical carrier comprises an amplitude modulated optical carrier.

Example 21: The optical communication system of Example 1, wherein the control signal is configured to reduce fluctuation of the modulation amplitude by altering the wavelength of the optical carrier generated by the wavelength tunable laser.

Example 22: The optical communication system of Example 1, wherein the control signal is configured to maintain the modulation amplitude above a threshold modulation amplitude by altering the wavelength of the optical carrier generated by the wavelength tunable laser.

Example 23: A wavelength-multiplexed optical communication system comprising:
 a plurality of wavelength tunable lasers configured to generate a plurality of optical carriers having different wavelengths;
 a plurality of electro-optical modulators configured to receive the plurality of optical carriers, receive a plurality of electronic input signals, and generate a plurality of modulated optical carriers using the plurality of electronic input signals, wherein the modulated optical carriers are generated by respective electro-optical modulators of the plurality of electro-optical modulators, and wherein the plurality of modulated optical carriers have a plurality of modulation amplitudes;
 a plurality of photoreceivers configured to receive the plurality of modulated optical carriers and generate a plurality of detected electronic signals, the detected electronic signal associated with the modulation amplitude of the respective modulated optical carrier received by the respective photoreceiver; and
 a control system configured to receive the plurality of detected electronic signals and generate a plurality of control signals and feed the plurality of control signals to the plurality of wavelength tunable lasers, wherein the control signal is generated based at least in part on the respective detected electronic signal of the plurality of detected electronic signals to alter the wavelength of optical carrier generated by the respective wavelength tunable laser.

Example 24: The optical communication system of Example 23, wherein differences between the wavelengths of optical carriers and resonant wavelengths of optical modes of the respective electro-optical modulators is from 10% to 300% of the full-width-half-maximum of the respective optical modes.

Example 25: The optical communication system of Example 23, wherein plurality of electro-optical modulators comprise optically resonant electro-optical modulators.

Example 26: The optical communication system of Example 25, wherein the optically resonant electro-optical modulators comprise ring resonator modulators (RRMs).

Example 27: The optical communication system of Example 23, wherein the plurality of control signals are generated based at least in part on RF powers of the respective detected electronic signals.

Example 28: The optical communication system of Example 27, wherein the control signals are configured to alter the wavelength of the optical carriers generated by respective wavelength tunable lasers to maintain the RF powers of the respective detected electronic signals above a threshold RF power or within a range of a target RF power.

Example 29: The optical communication system of Example 23, further comprising:
 a first optical link configured to transmit the optical carriers from the wavelength tunable lasers to the respective electro-optical modulators.
 a second optical link configured to transmit the modulated optical carriers from the electro-optical modulators to the respective photoreceivers.

Example 30: The optical communication system of Example 29, wherein the plurality of optical carriers are combined by a wavelength multiplexer to generate a multiplexed optical output that is transmitted to the electro-optical modulators via the first optical link.

Example 31: The optical communication system of Example 29, wherein the plurality of the modulated optical carriers are separated from an multiplexed modulated optical output by a wavelength demultiplexer before being received by the plurality of photoreceivers, and wherein the multiplexed modulated optical output is received from the electro-optical modulators via the second optical link.

Example 32: The optical communication system of Example 29, wherein at least one of the first and the second optical links comprise on-chip optical waveguides.

Example 33: The optical communication system of Example 29, wherein at least one of the first and the second optical links comprise optical fiber links.

Example 34: The optical communication system of Example 23, wherein the plurality of wavelength tunable lasers, and the plurality of photoreceivers are separated from the plurality of the optical modulators by a distance of from 0.1 meter to 10 kilometers.

Example 35: The optical communication system of Example 23, wherein the plurality of wavelength tunable lasers, and the plurality of photoreceivers are separated from the plurality of the optical modulators by a distance of from 1 centimeter to 10 centimeters.

Example 36: The optical communication system of Example 23, wherein the optical carriers have wavelengths in a range from 1200 nm to 1650 nm.

Example 37: The optical communication system of Example 23, wherein the wavelength tunable lasers comprise semiconductor lasers.

Example 38: The optical communication system of Example 37, wherein one or more wavelength tunable lasers comprise a distributed feedback (DFB) laser, a distributed Bragg reflector (DBR) laser, a vertical cavity surface-emitting laser (VCSEL), an external cavity laser (ECL), or a ring laser.

Example 39: The optical communication system of Example 23, wherein the modulated optical carriers comprise amplitude modulated optical carriers.

Example 40: The optical communication system of Example 1, wherein the control signal is configured to reduce fluctuations in the modulation amplitude of the modulated optical carrier by altering the wavelength of the optical carrier.

Example 41: The optical communication system of Example 23, wherein the plurality of control signals are configured to reduce fluctuations in the modulation amplitudes of the modulated optical carriers by altering the wavelength of the respective optical carriers.

Example 42: The optical communication system of Example 1, wherein the control signal is configured to maintain the modulation amplitude above a threshold modulation amplitude or within a range of a target amplitude by altering the wavelength of the optical carriers.

Example 43: The optical communication system of Example 23, wherein the plurality of control signals are configured to maintain the modulation amplitudes above one or more threshold modulation amplitudes or within a range of a target amplitude by altering the wavelengths of the respective optical carriers.

Example 44: A method of controlling an optical communication system comprising:
  by a wavelength tunable laser generating an optical carrier;
  by an electro-optical modulator:
    receiving the optical carrier from the wavelength tunable laser,
    receiving an electronic input signal, and
    generating a modulated optical carrier having a modulation amplitude using the optical carrier and electronic input signal;
  by a photoreceiver receiving the modulated optical carrier and generating a detected electronic signal associated with the modulation amplitude of the modulated optical carrier; and
  by a control system receiving the detected electronic signal and generating a control signal based at least in part on the detected electronic signal and feeding the control signal to the wavelength tunable laser to alter a wavelength of the optical carrier generated by the wavelength tunable laser.

Example 45: The method of Example 44, wherein the electro-optical modulator comprises an optically resonant electro-optical modulator.

Example 46: The method of Example 45, wherein the optically resonant electro-optical modulator comprises a ring resonator modulator (RRM).

Example 47: The method of Example 44, wherein generating the control signal comprises generating the control signal based at least in part on an RF power of the detected electronic signal.

Example 48: The method of Example 47, wherein the control signal is configured to alter the wavelength of the optical carrier generated by the wavelength tunable laser to maintain the RF power of the detected electronic signal above a threshold RF power.

Example 49: The method of Example 47, wherein the control signal is configured to alter the wavelength of the optical carrier generated by the wavelength tunable laser to maintain the RF power to within a tolerance of a target RF power.

Example 50: The method of Example 44, further generating the control signal comprises generating the control signal based at least in part on a reference signal received by the control system.

Example 51: The method of Example 50, wherein the reference signal comprises reference data stored in a memory of the control system.

Example 52: The method of Example 44, wherein the control system comprises a signal processing system and a monitoring circuit.

Example 53: The optical communication system of Example 52, wherein the signal processing system comprises an analog-to-digital converter configured to digitize the detected electronic signal and a decision logic circuit configured to generate the control signal based at least in part on the digitized detected electronic signal.

Example 54: The optical communication system of Example 52, wherein the monitoring circuit comprises an RF power detector or an RF power meter.

Example 55: The method of Example 1, further comprising:
  transmitting the optical carrier from the laser to the electro-optical modulator via a first optical link, and
  transmitting the modulated optical carrier from the electro-optical modulator to the photoreceiver via a second optical link.

Example 56: The method of Example 55, wherein at least one of the first and the second optical links comprise on-chip optical waveguides.

Example 57: The method of Example 55, wherein at least one of the first and the second optical links comprise optical fiber links.

Example 58: The method of Example 44, wherein the tunable laser, and the photoreceiver are separated from the optical modulator by a distance in a range from 1 centimeter to 10 centimeters.

Example 59: The method of Example 44, wherein the tunable laser, and the photoreceiver are separated from the optical modulator by a distance in a range from 0.1 meter to 10 kilometers.

Example 60 The method of Example 44, wherein the optical carrier has a wavelength in a range from 1200 nm to 1650 nm.

Example 61: The method of Example 44, wherein the wavelength tunable laser is a semiconductor laser.

Example 62: The method of Example 61, wherein the wavelength tunable laser comprises a distributed feedback (DFB) laser, a distributed Bragg reflector (DBR) laser, a vertical cavity surface-emitting laser (VCSEL), an external cavity laser (ECL), or a ring laser.

Example 63: The method of Example 44, wherein the modulated optical carrier comprises an amplitude modulated optical carrier.

Example 64: The method of Example 44, wherein the control signal is configured to reduce fluctuation of the modulation amplitude by altering the wavelength of the optical carrier generated by the wavelength tunable laser.

Example 65: The method of Example 44, wherein the control signal is configured to maintain the modulation amplitude above a threshold modulation amplitude or within a range of a target amplitude by altering the wavelength of the optical carriers.

Example 66: A control system comprising:
  an input configured to receive a detected electronic signal from a photodetector,
  an electronic circuit configured to process the detected electronic signal to generate a control signal based at least in part on the detected electronic signal, and
  an output configured to output the control signal;
  wherein the control signal is configured to control a wavelength tunable laser to alter a wavelength of an optical carrier generated by the wavelength tunable laser based at least in part on the detected electronic signal.

Example 67: The control system of Example 66, wherein the detected electronic signal is generated by the photodetector upon receiving an optical signal comprising the optical carrier.

Example 68: The control system of Example 66, wherein the optical signal comprises a modulated optical carrier generated by an optically resonant electro-optical modulator using the optical carrier.

Example 69: The control system of Example 68, wherein the optically resonant electro-optical modulator comprises a ring resonator modulator (RRM).

Example 70: The control system of Example 66, wherein modulated optical carrier comprises an amplitude modulated optical carrier.

Example 71: The control system of Example 66, wherein the control system generates the control signal based at least in part on an RF power of the detected electronic signal.

Example 72: The control system of Example 71, wherein the control signal is configured to alter the wavelength of the optical carrier generated by the wavelength tunable laser to maintain the RF power of the detected electronic signal above a threshold RF power.

Example 73: The control system of Example 66, wherein the control system comprises a signal processing system and a monitoring circuit.

Example 74: The control system of Example 73, wherein the signal processing system comprises an analog-to-digital converter configured to digitize the detected electronic signal and a decision logic circuit configured to generate the control signal based at least in part on the digitized detected electronic signal.

Example 75: The control system of Example 66, wherein the control system is configured to generate the control signal based at least in part on reference data stored in a memory of the control system.

Example 76: An electro-optical system configured to generate an optical carrier and receive a modulated optical carrier comprising the optical carrier, the electro-optical system comprising:
 a wavelength tunable laser configured to generate the optical carrier;
 a photoreceiver configured to receive the modulated optical carrier and generate a detected electronic signal associated with a modulation amplitude of the modulated optical carrier; and
 a control system configured to receive the detected electronic signal and generate a control signal based at least in part on the detected electronic signal and feed the control signal to the wavelength tunable laser to alter a wavelength of the optical carrier generated by the wavelength tunable laser.

Example 77: The electro-optical system of Example 76, wherein the modulated optical carrier is generated by an optically resonant electro-optical modulator using the optical carrier received from the electro-optical system.

Example 78: The electro-optical system of Example 77, wherein the optically resonant electro-optical modulator comprises a ring resonator modulator.

BRIEF DESCRIPTION OF THE DRAWINGS

In the following description of the various embodiments, reference is made to the accompanying drawings which form a part hereof, and in which is shown by way of illustration various embodiments of the device.

It is to be understood that other embodiments may be utilized and structural changes may be made without departing from the scope of present invention.

These and other features will now be described with reference to the drawings summarized above. The drawings and the associated descriptions are provided to illustrate embodiments and not to limit the scope of the disclosure or claims. Throughout the drawings, reference numbers may be reused to indicate correspondence between referenced elements. In addition, where applicable, the first one or two digits of a reference numeral for an element can frequently indicate the figure number in which the element first appears.

DETAILED DESCRIPTION OF CERTAIN PREFERRED EMBODIMENTS

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied using a variety of techniques including techniques that may not be described herein but are known to a person having ordinary skill in the art. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein. It will be understood that when an element or component is referred to herein as being "connected" or "coupled" to another element, it can be directly connected or coupled to the other element or intervening elements may be present therebetween.

Stabilization of Optically Resonant Electro-Optical Modulators

Optical modulators, or electro-optic modulators (EOM), are devices used to encode an electrical signal (e.g., an electronic input signal associated with input DATA) onto an optical carrier, whereby the optical carrier wavelengths are typically centered around common communication wavelength (e.g. 1.31 μm or 1.55 μm) and have demonstrated modulation frequency bandwidths above 100 GHz. In some cases, an optical carrier is an optical wave (e.g., a guided optical wave or light wave, a free space optical wave or light wave) having a wavelength from 400 nm to 700 nm, from 700 nm to 1000 nm, from 1000 nm to 1300 nm, from 1200 nm to 1300 nm, 1300 nm to 1650 nm, from 1650 nm to 1800 nm from 1800 nm to 2000 nm, from 2000 nm to 2500 nm, from 250 nm to 3000 nm, or any range formed by any of these values or larger or smaller values.

Mach-Zehnder Modulator (MZM) type EOMs that are the most common EOM, utilize interference between two or more portions of the optical carrier passing through arms of an interferometer and have a non-resonant optical transfer function with relatively small intensity-wavelength sensitivity. In contrast, an optically resonant EOM (herein referred to as resonant EOM) utilizes resonant enhancement of the amplitude of a circulating optical carrier within an electro-optically active cavity (e.g., an electro-optically active ring resonator) to increase the efficiency of the electro-optical interaction between an electric signal or electronic input signal and the optical carrier. In some implementations, a resonant EOM (e.g., a ring resonator modulator) may comprise an electro-optically active optical cavity configured to modulate the amplitude of light transmitted through an optical waveguide coupled to the optical cavity proportional to an input signal applied on the optical cavity. In some cases, the signal may comprise a time varying voltage or current applied on or across an optically active region of the optical cavity. The signal may modulate a phase of light (e.g., optical carrier) circulating within the optical cavity by electro-optically modulating a refractive index of the optical cavity resulting in amplitude modulation of light transmitted through the waveguide coupled to the optical cavity. In some cases, the signal may comprise data (e.g., digital data), a digital signal, an analog signal, or any other signal that has to be converted to optical amplitude modulation of an optical carrier.

The optical cavity of a resonant EOM may support one or more optical modes where each optical mode has a resonant wavelength (also refereed to resonant wavelength of the resonant EOM). In some cases, the spectrum of the optical mode may comprise a resonant line centered at the resonant wavelength and having a full-width-half-max (FWHM) herein referred to as mode linewidth. In some implementations, the RRM may comprise an optical cavity or an optical resonator (e.g., a ring resonator) optically coupled (e.g., via evanescent waves) to an optical waveguide (e.g., a single mode waveguide). When an optical carrier is fed to an input of the optical waveguide coupled to the ring resonator, the spectrum of a transmitted optical power through the waveguide (e.g., received from an output of the optical waveguide), may comprise a transmission dip near the resonant wavelength (e.g., centered at the resonant wavelength), and the transmitted optical power may be lower at the resonant wavelength compared to other wavelengths. When the wavelength of the optical carrier is tuned to a wavelength near the resonant wavelength of an optical mode of the optical cavity (e.g., to a wavelength within the corresponding mode linewidth), the amplitude of optical carrier circulating inside the optical cavity builds up and the transmitted optical power can be lower. When the wavelength of the optical carrier is tuned far from the resonant wavelength of the optical mode of the optical cavity (e.g., when a spectral distance between the resonant wavelength and wavelength of the optical carrier is larger than the one or two times the mode linewidth), the buildup of the amplitude of the circulating optical carrier will be significantly less, and the transmitted optical power can be. Thus, a resonant EOM exhibits an optical transfer function (i.e., a function that quantifies variation of transmitted optical power versus optical carrier wavelength) with relatively large intensity-wavelength sensitivity, where the intensity can be the intensity associated with the transmitted optical power. In some cases, a MZM with imbalanced interferometer arms, e.g. asymmetric MZM (AMZM), may also exhibit large-wavelength sensitivity similar to a resonant EOM.

In some cases, an optically resonant EOM (or a resonant EOM) may comprise a ring resonator modulator (RRM) also referred to as a microring modulator. The optical cavity of an RRM may comprise a ring resonator (also referred to as microring resonator). A ring resonator may comprise a ring shaped waveguide. In some cases, a ring resonator can be a monolithically fabricated on chip device. In some cases, an RRM may comprised a semiconductor material. In some implementations, a ring resonator modulator (RRM) type EOM may comprise an optical cavity (e.g., a ring resonator or a ring cavity) and one or more p-n or p-i-n junction diodes embedded within the optical cavity, where the p-n or p-i-n junctions are configured to change the phase of the optical carrier circulating inside the optical cavity proportional to a voltage or current applied to the corresponding junction. In some examples, a p-n or p-i-n junction diode may comprise a group III-V or group IV semiconductor. In some cases, the ring resonator modulator may comprise other electro-optically active materials. In some cases, free-carrier dispersion of either electrons, holes, or both, may be used to change the optical refractive index of the cavity material resulting in a change in an effective modal index of the circulating optical carrier and therefore a shift in the corresponding optical transfer function. In some implementations, an RRM type EOM may comprise ring resonator, microring resonator, or microdisk resonator that comprise a material with large electro-optical coefficient (e.g., LiNbO3, electro-optical polymers, and like). Accordingly, in some cases, an RRM may comprise a microdisk modulator.

The methods and system described below may be used to stabilize (e.g., remotely stabilize) modulation of an optical carrier in optical links that employ at least one resonant EOM or any other EOM having a wavelength sensitive transfer functions. In various implementations, modulation of the optical carrier may comprise modulating the amplitude, phase, or polarization of the optical carrier. In various implementations, stabilizing the modulation of the optical carrier may comprise maintaining modulation amplitude, modulation index, signal-to-noise ratio, and/or an error rate associated with the modulated optical carrier within a set range, above a threshold value, or below a threshold value.

In some implementations, RRM may be employed for modulating the intensity of an optical carrier in an intensity modulated/direct-detection (IM/DD) optical communication systems (e.g., optical links and optical interconnects), however other EOMs could also be used, such as AMZMs. In some other implementations, RRM may be employed for modulating the phase an optical carrier.

RRMs and other resonant or non-resonant EOMs that support high sensitivity electro-optical modulation (e.g., having transfer functions with large intensity-wavelength sensitivity) are also sensitive to environmental perturbations, such as thermal, radiation, pressure, stress/strain, chemical, etc., which make their stable operation (e.g., maintaining a certain modulation index, signal-to-noise ratio, and/or error rate) a primary concern for utilization in optical communication links (e.g., digital and analog optical links). In some implementations, a control system may tune the resonant wavelength of the RRM cavity, or optical transfer function of the EOM relative to the optical carrier wavelength to stabilize the optical modulation amplitude near a peak value. Such control methods may be referred to as "local" feedback methods. In some other implementations, a control system may tune the optical carrier wavelength relative to the resonance wavelength of the RRM (or relative to the optical transfer function of the EOM) to stabilize the optical modulation amplitude near a target value (e.g., a peak value).

Figure 1:
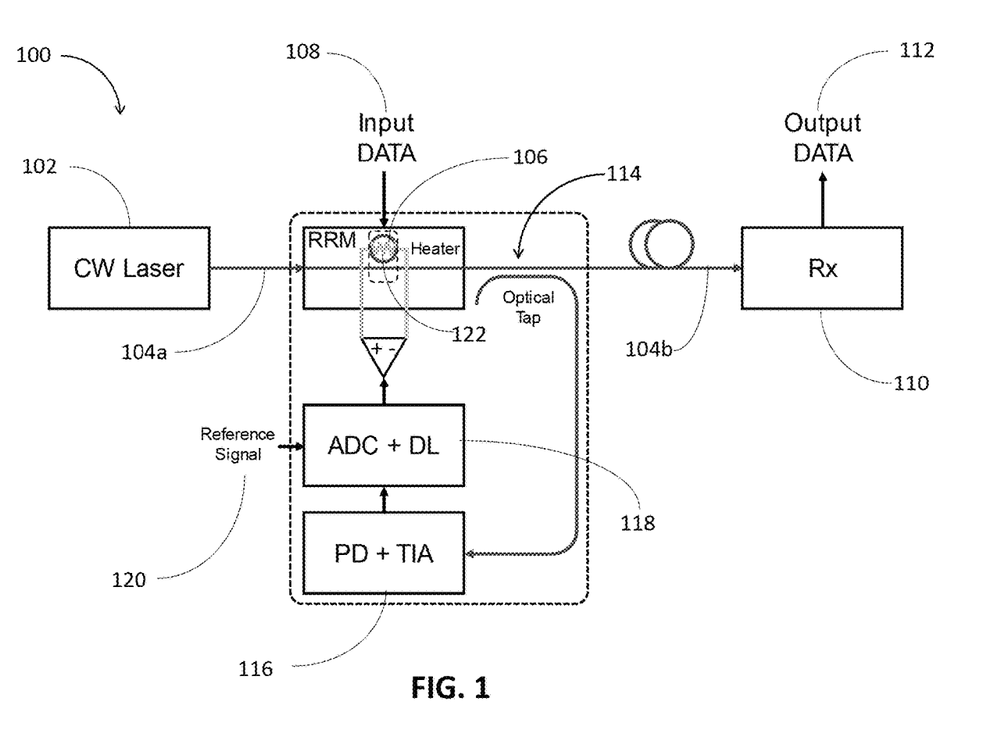
FIG. 1 illustrates a block diagram of an optical communication system employing a ring resonator modulator (RRM), with feedback and control provided by local thermal tuning (i.e., via thermo-optical effect).

The basic principle of "local" feedback control of an EOM (e.g., a resonant EOM) is shown in FIG. 1 using RRM as an example. FIG. 1 illustrates an optical communication system 100 (e.g., an optical link or an optical interconnect) comprising a source (e.g., a laser source 102), and electro-optical modulator (e.g., the RRM 106 coupled to a waveguide), a photoreceiver 110 and one or more waveguides (e.g., optical fibers 104a/104b) optically connecting the source, EOM, and the photoreceiver. An optical carrier is generated by a laser 102 and is transmitted to an RRM 106 (e.g., via an optical fiber 104a), which encodes/modulates input electronic DATA 108 (e.g., an electronic input signal) onto the optical carrier (e.g., by modulating the amplitude, phase, polarization, or mixture thereof, of the optical carrier). The resulting modulated optical carrier propagates through a length of the optical fiber 104b—and may be amplified along the way—before it is received by a photoreceiver (Rx) 110 and converted to an electrical DATA output signal at the optical photodetector receiver (Rx). Prior to launching the modulated signal into fiber for long-distance transmission, the optical signal may be sampled via an optical tap 114, and converted into an analog electrical signal via a photoreceiver 116. The photoreceiver 116 may include a photodetector (PD) and a transimpedance amplifier (TIA). The analog electrical signal is then received by a signal processing system 118. The signal processing system 118 may include an analog-to-digital converter (ADC) that converts the analog electrical signal generated by the photoreceiver 116 to a digital signal and a decision logic (DL) circuit that compares the resulting digital signal to a reference signal 120, and outputs a drive current. For example through an amplifier, to a heater element 122 (e.g., integrated resistor). In some cases, the temperature of the heater element 122 may be adjusted to tune the resonance wavelength of the RRM 106 and maintain a target spectral distance between the optical carrier wavelength and the resonant wavelength of the RRM for stable and efficient electro-optical modulation.

Remote Stabilization of Resonant Modulators Based on Laser Wavelength Tuning

While the local control of RRM and other resonant EOMs described above may be used to support stable electro-optical modulation in optical communication links and optical interconnects, this method may not be a practical and reliable for applications where the RRM (or other resonant EOMs) are exposed to perturbations (e.g., temperature fluctuations, mechanical vibrations, mechanical impact, and the like) or generally to a harsh environment and/or applications that require less complex communication systems. For example, when the corresponding optical link is used to transfer data out of a system (e.g., an imaging system, measurement system, monitoring system and the like) located in a cryogenic or a high-radiation environment, the local control (e.g., based on the architecture shown in FIG. 1) may not be able to stabilize the optical modulation provided by RRM.

The methods and systems described below may solve or reduce the impact of some of the problems described above with respect to local feedback control approach.

Figure 2:
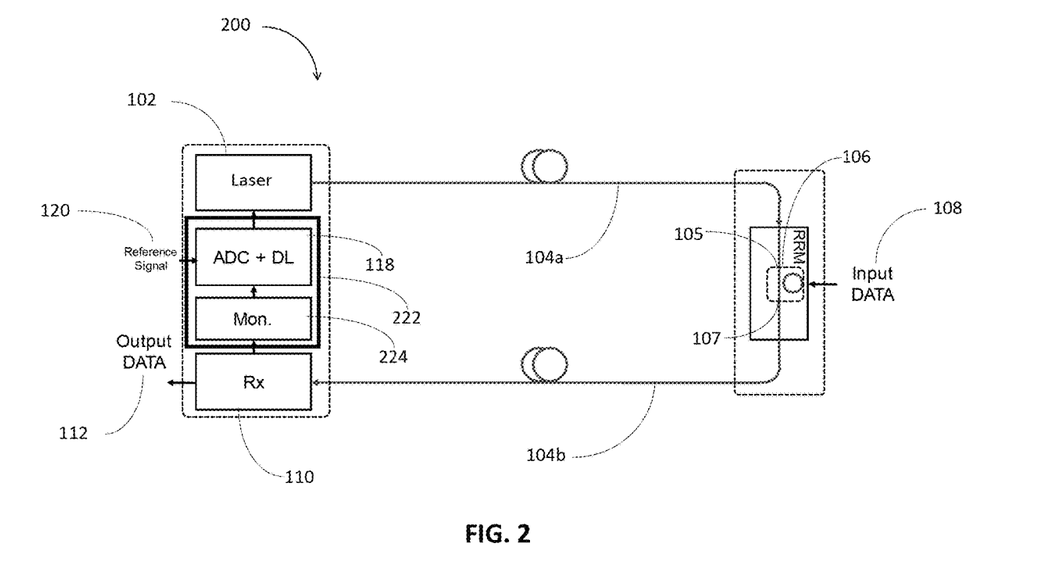
FIG. 2 illustrates an optical communication system employing an RRM, with feedback and control provided remotely by tuning the wavelength of the optical carrier generated by a laser.

FIG. 2, is a simplified block diagram of an optical communication system 200 (e.g., an optical link or an optical interconnect) that uses an RRM for modulating an optical carrier and uses a feedback loop to remotely control the optical modulation without locally controlling the RRM. The optical communication system 200 may be used receive input DATA 108 and generate output DATA 112. In some examples, output DATA 112 may be a copy of the input DATA. In some cases, output DATA 112 may be proportional to the input DATA (e.g., having the same temporal variation and relative amplitude change). In some cases, input DATA 108 may be received in a first environment or a first location and the output DATA 112 may be generated in a second environment or a second location. In some cases, the first and the second environments can be separated environments having different temperatures, pressures, vibrational properties, or humidity. In some examples, input DATA 108 may be an electronic input signal and output DATA 112 may be an electronic output signal. In various examples, input DATA 108 and output DATA 112 may be analog or digital signals. In some cases, input DATA 108 may comprise an input electronic signal received from an electronic device or system, such as an integrated circuit, a sensor, or imaging system, or the like. The optical communication system 200 may include a laser 102 (e.g., a wavelength tunable laser) that generates an optical carrier (e.g., a CW optical carrier), a control system 222 that controls the wavelength of the optical carrier (the wavelength of the laser 102), an RRM 106 (or other types of resonant EOMs) that modulates the optical carrier (e.g., modulates the amplitude of the optical carrier) using the input electronic signal or input DATA 108, and a photoreceiver 110 (e.g., a photodetector, an amplified photodetector, and the like) that converts the modulated optical carrier to an electrical signal (e.g., analog electrical signal). The RRM 106 may be optically connected to the laser 102 via a first optical link 104a (e.g., an optical fiber, a waveguide or an integrated waveguide) and to the photoreceiver 110 via a second optical link 104b (e.g., an optical fiber, a waveguide or an integrated waveguide). In some cases, the RRM 106 may include an input port 105 configured to receive light and an output port 107 through which modulated light exits the RRM 106. In some such cases, the input port 105 and the output port 107 of the RRM 106 can be the input port and the out port of a waveguide that is optically coupled (e.g., evanescently coupled) to the electro-optically active ring resonator that modulates light. In some cases, an input port 105 of the RRM 106 may be optically connected to the first optical link 104*a* and an output port 107 of the RRM 106 may be optically connected to the second optical link 104*b*. In some implementations, the RRM 106 may be an RRM fabricated on a chip (e.g., a silicon chip) and may be integrated with one or more optical, optoelectronic or electronic components. In some such implementations, the RRM 106 may be monolithically fabricated on a chip. In some examples, the optical waveguide that is coupled to the ring resonator can be an on-chip waveguide integrated with the RRM 106 on a single chip. In other examples, the waveguide can be a portion of an optical fiber. In some implementations, the first and the second optical links may be optically connected to an optical coupler that couples light (optical carrier) from the first optical link 104*a* to the RRM 106 and couples modulated light (modulated optical carrier) from the RRM 106 to the second optical link 104*b*. In some such cases, the input port 105 and the output port 107 of the RRM 106 can be the input port and the output port of the optical coupler. In some cases, the optical coupler may comprise a prism. In some examples, the first and second optical links 104*a*/104*b* can be optical fiber links (e.g., single mode optical fibers). In some other examples, the first and the second optical links 104*a*/104*b* can be on-chip waveguides. In yet other examples, the first and the second optical links 104*a*/104*b* can be any type of optical connection including but not limited to free-space optical connection. In some cases, the RRM 106 may be in an environment (depicted by a dashed box), exposed to various perturbations (e.g., temperature, pressure, radiation and the like). For example, the RRM 106 can be in a cryogenic or high-radiation environment. However, the use of the optical communication system 200 need not be limited to applications where the RRM 106 is in a cryogenic or high-radiation environment.

The laser 102 can be wavelength tunable semiconductor laser, e.g., distributed Bragg reflector (DBR), distributed feedback (DFB), or vertical cavity surface emitting laser (VCSEL). A wavelength tuning range of the wavelength tunable laser can be between 1-10 nm, or 10-20 nm or 20-40 nm. The optical carrier can have a wavelength between 450 nm-700 nm, 700 nm-1260 nm, 1260 nm and 1700 nm, or 1700 nm and 2500 nm. The photoreceiver 110 can be a p-i-n photodetector, with responsivity of 0.5 to 0.8 A/W or 0.8-1 A/W or greater, with optical-to-electrical conversion frequency bandwidths of 1-2.5 GHz, 2.5-10 GHz, 10-25 GHz, 25 GHz-50 GHz, 50 GHz-75 GHz, 75 GHz-100 GHz or larger. In some implementations, the photoreceiver 110 can be an avalanche photodiode (APD) with multiplication gain in the range 1-10, 10-100, or 100-1000, with optical-to-electrical conversion frequency bandwidths of 1-2.5 GHz, 2.5-10 GHz, 10-25 GHz, 25 GHz-50 GHz, or 50 GHz-75 GHz.

In some implementations, the laser 102, the control system 222, and the photoreceiver 110 may be physical separated from the RRM 106 by a distance. The distance may be between 1 cm-10 cm, 10 cm-20 cm, 20 cm-0.5 m, 0.5 m-1 m, 1 m-10 m, 10 m-100 m, 100 m-1 km, 1 km-10 km, or other ranges, including smaller scales when implemented on an integrated circuit (e.g., 10 µm, 100 µm, 1000 µm). In some such implementations, the laser 102, the control system 222 and the photoreceiver 110 may be collocated (e.g., on board, on a chip, within a single compartment and the like). In some implementations, the laser 102, the control system 222 and the photoreceiver 110 may be integrated on a single chip or single circuit board. In some implementations, the laser 102, and the photoreceiver 110 may be monolithically fabricated on a single or separate chips while the control system 22 may be fabricated on a separate chip. The control system 222 may include a monitoring circuit 224 (e.g., a linear or logarithmic RF power detector, a linear or logarithmic RF power meter, and the like) and signal processing system 118 (e.g., a digital signal processing system). In some examples, the signal processing system 118 may comprise an analog-to-digital converter (ADC) and a decision logic circuit (DL).

Advantageously in the optical communication system 200 control and stabilization of the optical modulation provided by the RRM 106 can be remotely performed based on monitoring the modulated optical carrier received by the photoreceiver 110 and providing a control signal to the laser 102 to maintain a modulation amplitude of the modulated optical carrier within a certain range or above a threshold modulation amplitude. In some cases, the control signal may be provided to the laser 102 to maintain an error rate or signal-to-noise-ratio associated with the modulated optical carrier within a certain range or below a threshold error rate or SNR. In some cases, the control signal may be generated based at least in part on a modulation amplitude of the optical career.

In some cases, the control signal may change the wavelength of the optical carrier generated by the laser 102 such that a difference (a spectral distance) between the optical carrier wavelength and the resonant wavelength of an optical mode of the RRM (an optical mode used for electro-optical modulation), is maintained within a range or stays constant and equal to a target value. The control signal may be generated by the control system 222 based at least in part on a detected electronic signal received from the photoreceiver 110 (e.g., the RF power and/or the amplitude of the detected electronic signal). In some cases, the control signal to the laser 102 may be a current or voltage provided to one or more tuning sections of the laser 102 (e.g. cavity mirror or grating, cavity phase, or cavity gain medium). In some cases, the control signal may locally change the temperature of one or more tuning sections of laser 102. In some cases, the control signal may change a current (e.g., an injection current) provided to the laser (e.g., to a tuning section of the laser). In some cases, the control signal may tune a resonant wavelength or frequency of the laser cavity by changing a resonant optical path length of the laser cavity (e.g., by changing the refractive index of the cavity or a length of the cavity). In some examples, the control signal may change an orientation of a grating used to form the laser cavity (e.g., an external laser cavity). In some implementations, the control system 222 may periodically measure the optical modulation amplitude or the RF power of the detected electronic signal and generate the control signal to adjust the optical carrier wavelength, on a timescale from 0.1-1 µs, from 1-10 µs, from 10-100 µs, from 1-10 ms, from 10 ms to 100 ms, or any range formed by any of these values or possibly larger or smaller. In some cases, control system 222 may continuously measure the optical modulation amplitude or the RF power of the detected electronic signal and generate the control signal to adjust the optical carrier wavelength. In some cases, control system 222 may measure the optical modulation amplitude or the RF power of the detected electronic signal at measurement time determined by the control system 222 and generate the control signal to adjust the optical carrier wavelength. In some cases, the control system 222 may determine a measurement time based at least on part on: the optical modulation amplitude, the RF power, or a signal to noise ratio of the detected electronic signal, or an error rate associated with the detected electronic signal, at previous measurement time.

The optical carrier wavelength adjustment via the closed loop control described above and show in FIG. 2 may reduce sensitivity of the resulting optical modulation (e.g., fluctuations in the optical modulation amplitude) to temperature induced fluctuations, which can arise, for example, when the temperature of the medium surrounding the RRM 106 fluctuates (e.g., when the RRM 106 operates in a cryogenic or high-radiation environment).

With continued reference to FIG. 2, the optical carrier (e.g., a continuous-wave, CW, light) generated by the laser 102 is transmitted to the RRM 106 via the first optical link 104*a*. The RRM 106 modulates the optical carrier generated by the laser 102 using an electronic input signal (input DATA 108). For example, the RRM 106 may modulate an amplitude, a phase or a polarization of the optical carrier. The electronic input signal or the input DATA 108*a* may be an electronic input signal received from an electronic device or system (e.g., an integrated circuit, sensor, or imaging system). The modulated optical carrier output by the RRM 106 is transmitted to the photoreceiver 110 through the second optical link 104*b* where it is converted to a detected electronic signal (e.g., an analog signal) by the photoreceiver (Rx) 110. In some implementations, the laser 102 and the photoreceiver 110 may be co-located (e.g., on a chip, on a board, inside a single compartment). In some cases, the first and/or the second optical links 104*a*/104*b* may include one or more optical amplifiers to amplify the optical carrier transmitted to the RRM 106 or the modulated optical carrier transmitted to the photoreceiver 110.

In some implementations, a first portion of the detected electronic signal may be transmitted to a monitoring circuit 224 of the control system 222 and a second portion of the detected electronic signal may be output as output data 112 (or electronic output signal). The output data 112 (electronic output signal), that may be identical to the input data 108 (electronic input signal), may be transmitted to a computing system for further processing. In some examples, the monitoring circuit 224 may use the first portion of the detected electronic signal to generate a monitor signal (e.g., an analog signal) associated with an optical modulation amplitude (OMA) of the modulated optical carrier generated by RRM 106.

In some cases, the monitor signal may be proportional to the RF and/or average RF power of the detected electronic signal. In some other cases, the monitor signal may be proportional to an oscillation amplitude of the detected electronic signal. In yet other cases, the monitor signal may be proportional to an average voltage or average current associated with the detected electronic signal and therefore proportional to an average optical power received by the photoreceiver 110. In some cases, the monitor signal can be a nonlinear function of the detected electronic signal. In various implementations, the monitor signal may be used to generate a control signal to control the optical carrier wavelength or a difference (spectral distance) between the optical carrier wavelength and the resonant wavelength of optical mode used to modulate the optical carrier (e.g., by tuning the wavelength of the laser 102).

In some implementations, the monitor signal generated by the monitoring circuit 224 (e.g. linear or logarithmic RF power meter) is digitized by an analog-to-digital converter (ADC) and transferred to a decision logic (DL) circuit that outputs a control signal to the laser 102. In some examples, the wavelength of the optical carrier generated by the laser 102 (e.g., a wavelength tunable laser) may be controlled by the control signal. The DL may generate the control signal based at least in part on the digitized monitor signal received from the analog-to-digital converter and data stored in a memory of the control system 222. For example, the DL may generate the control signal based on a comparison between the digitized monitor signal and a value of a parameter stored in the DL. Iterative, search, or optimization routines can be used in the digital domain to determine whether to tune the optical carrier wavelength to longer or shorter wavelengths in order to either maintain or increase the electro-optical modulation provided by the RRM 106, in the presence of environmental perturbations (e.g. change in temperature).

In some cases, the control system 222 may comprise a non-transitory memory configured to stored machine readable instructions and data, and an electronic processor (e.g., a hardware processor) configured to execute the machine readable instructions stored in the non-transitory memory to generate the control signal, control the operation of the signal processing system 118, monitoring circuit 224, photoreceiver 110, or the certain operation aspects of the laser 102. In some cases, the control system 222 may comprise a field programmable gate array (FPGA), or other computing systems (e.g., digital computing systems).

In some implementations, the control system 222 may generate a control signal to change the optical carrier wavelength (i.e., the laser wavelength) to maintain the modulation amplitude of the modulated optical carrier within a modulation amplitude range (e.g., a target range, or a range determined by a tolerance) or above a threshold modulation amplitude. In some implementations, the control system 222 may generate a control signal to change the optical carrier wavelength (e.g., relative to the resonant wavelength of the optical mode used for carrier modulation) to maintain the RF power of the detected electronic signal within a target RF power range (e.g., a target range, or determined by a tolerance) or above a threshold RF power level. In some cases, the control signal may alter the optical carrier wavelength to maintain the RF power at target RF power (e.g., a peak target RF power) or within a range from the target RF power associated with a tolerance. For example, the control signal may be able to maintain the RF power within 5%, 1%, 0.5%, 0.1%, 0.05%, 0.01%, 0.005%, 0.001% or any range formed by any of these values or possibly larger or smaller, from the target RF power.

In some cases, the control signal may be provided to the laser 102 to maintain an error rate or signal-to-noise-ratio associated with the modulated optical carrier or the detected electronic signal within a certain range or below a threshold error rate or threshold SNR. In some cases, the control signal may be generated based at least in part on the RF power of the detected electronic signal.

In some cases, the control signal may reduce fluctuation of the modulation amplitude by altering the optical carrier wavelength. Further details regarding the relation between optical carrier wavelength, modulation amplitude and the RF power of the detected electronic signal is described below (with reference to FIG. 4 and FIG. 5).

In some other implementations, the monitor signal may be used by an analog control circuit to generate the control signal. The analog control circuit may use an external reference signal 120 and the monitor signal to generate the control signal.

In some implementations, the modulation amplitude target range, the threshold modulation amplitude, the target RF power, the target modulation amplitude, the target RF power range, or the threshold RF power, may be reference values stored in a memory of the control system 222. In some cases, the reference values may be adjustable or selectable by a user, for example, via a user interface of the control system 200. In various implementations, the modulation amplitude target range, the threshold modulation amplitude, the target RF power, the target modulation amplitude, the target RF power range, or the threshold RF power, may be reference values stored in a memory of the control system 222. In some implementations, the modulation amplitude target range, the threshold modulation amplitude, the target RF power, the target modulation amplitude, the target RF power range, or the threshold RF power, may be values calculated or extracted based at least in part on a reference signal 120 received by the control system 222. In some implementations, the reference signal 120 may be received by the DL as a fixed or programmable voltage. In some cases, the DL may use the reference signal 120 in place of or in addition to the stored reference data to generate the control signal.

Advantageously, when the optical communication system 200 is used to transfer the input data 108 from a system in a first environment (e.g., a harsh environment) to a computing system in a second environment, only the RRM 106 (and a portion of optical links 104a/104b) are exposed to the conditions of the first environment. As such, in addition to reduced complexity of the RRM 106 (e.g., due to elimination of the components required for local control), the reliability of the system is improved by isolating the laser 102, the control system 222 and the photoreceiver 110 from the first environment (e.g., a harsh environment).

Exposure to perturbations (e.g., temperature variations, radiation or mechanical vibrations in a harsh environment), may induce shifts (e.g., randomly varying shifts, constant shifts, and the like) in the resonant wavelength of an optical mode of the RRM 106 (e.g., the optical mode used for generating the optical modulation) and therefore change a difference between the optical carrier wavelength and the resonant wavelength of the optical mode. In some cases, a change (e.g., induced by external perturbation) in the difference between the optical carrier wavelength and the resonant wavelength of the optical mode may result in reduced optical modulation efficiency provided by the RRM 106.

Depending on the magnitude of the induced shift in the resonant wavelength of the optical mode, different ranges of laser wavelength tunability may be required to stabilize the optical modulation efficiency (e.g., by stabilizing or dynamically adjusting the difference between the laser wavelength and the resonant wavelength of the optical mode). As such, different tunable lasers may be used as the source of the optical carrier in the optical communication system 200. In the case of small optical resonance shifts (e.g., 1-5 nm), lasers that have a narrow or fine tuning range (e.g., 0.1-1 nm) may be used, including distributed feedback (DFB), distributed Bragg reflector (DBR), and even vertical cavity surface-emitting laser (VCSEL). In the case of large optical resonance shifts (e.g., 5 to 10 nm or 10 to 20 nm), wide or coarse tuning (e.g., 1 nm to 5 nm) lasers may be used, including external cavity lasers (ECL), sampled-grating and digital concatenated grating distributed Bragg reflector (SG-DBR and DCG-DBR), and various other designs based on the Vernier effect of filters, including Bragg gratings and ring resonators.

In various implementations the wavelength tunable laser may comprise tunable lasers such as, for example, described in U.S. Pat. No. 10,320,152, titled "Tunable Laser" filed on Mar. 28, 2018 and issued on Jun. 11, 2019, U.S. Pat. No. 112,515,84, titled "Tunable Laser" filed on Jun. 4, 2019 and issued on Feb. 15, 2022, and U.S. Pat. No. 10,355,451, titled "Laser with Sampled Grating Distributed Bragg Reflector", filed on Apr. 25, 2018 and issued on Jul. 16, 2019, which are each hereby incorporated herein by reference in their entirety.

Figure 3:
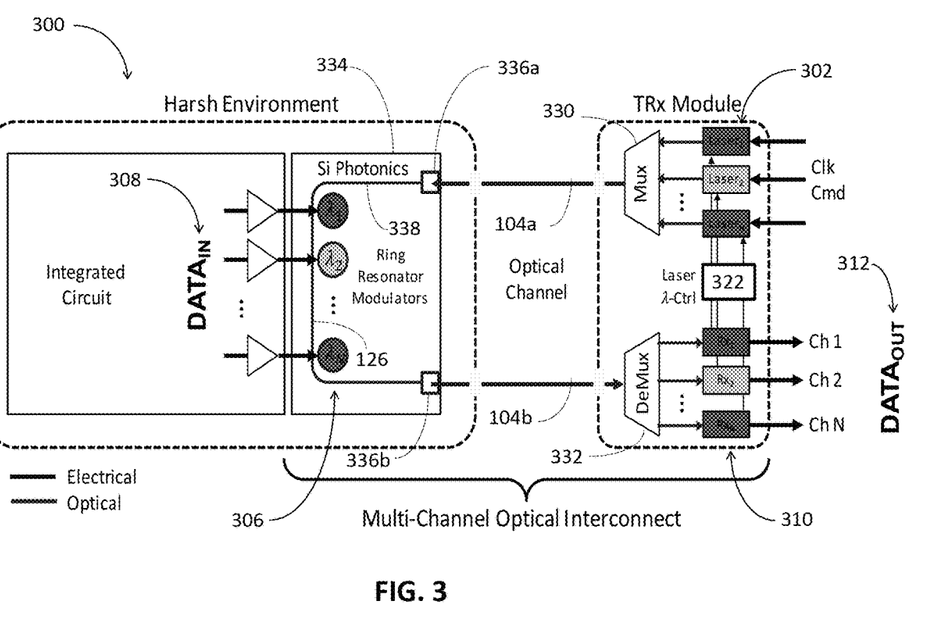
FIG. 3 illustrates a block diagram of a multi-channel wavelength-multiplexed optical communication system, employing a plurality of RRMs fed by a plurality of lasers where the electro-optical modulation in each RRM is remotely controlled by tuning the wavelength a laser that generates the optical carrier for the RRM.

In some implementations, the architecture presented in FIG. 2 can be further expanded by including a plurality of optical carriers with different wavelengths and a plurality of EOMs (e.g., RRMs) and using wavelength division multiplexing (WDM) to optically transfer data (e.g., from a first environment to a second environment). FIG. 3 illustrates a block diagram of a multi-channel wavelength-multiplexed optical communication system 300, employing a plurality of RRMs fed by a plurality of lasers where the electro-optical modulation in each RRM is remotely controlled by tuning the wavelength of a laser that generates the optical carrier for the RRM. Advantageously, using wavelength division multiplexing may increase the communication capacity (e.g., data rate, number of channels supported, and the like) of the optical communication system 300 compared to the optical communication system 200 without using additional optical links. As shown in FIG. 3, the optical communication system 300 may comprise a plurality of RRMs 306 each configured to modulate an optical carrier having a specific wavelength. For each RRM of the plurality of RRMs 306, a dedicated tunable laser from a plurality of lasers 302 (e.g., wavelength tunable) may generate the optical carrier having a wavelength near the resonant wavelength of an optical mode of the RRM. Similarly, a photoreceiver of a plurality of photoreceivers (Rx's) 310 may receive the modulated optical carrier output by the RRM and generate a detected electronic signal. A control system 322 may use the detected electronic signal of the plurality of detected electronic signals to generate a control signal to control the wavelength tunable laser that generates the optical carrier. The control signal may control the optical carrier wavelength (the laser wavelength) fed to the RRM to maintain the modulation amplitude or the corresponding RF power with a set range or above a threshold level. The photoreceiver may also generate a corresponding electronic output signal (output DATA). In some implementations, the control system 322 may include a plurality of control systems. In some cases, one or more control systems of the plurality of control system included on the control system 322 may be similar to control system 222 described with respect to FIG. 2. In some cases, one or more control systems of the plurality of control system included on the control system 322 may at least include monitoring circuit (e.g., a linear or logarithmic RF power detector, a linear or logarithmic RF power meter, and the like) and a signal processing system.

The plurality of optical carriers generated by the plurality of lasers 302 may be combined together using a wavelength multiplexer (Mux) 330 to generate a multiplexed optical output comprising the plurality of the optical carriers. The multiplexed optical output may be transmitted to the plurality of RRMs 106 via a first optical link 104a (e.g., a single optical fiber, a waveguide, an on-chip waveguide, and the like). In some examples, the plurality of the RRMs 306 may be physically separated from the plurality of lasers 302. the plurality of photoreceivers 310, and the control system 322, by a distance. The distance may be from 1 cm to 10 cm, from 10 cm to 20 cm, from 20 cm to 0.5 m, from 0.5 m to 1 m, from 1 m to 10 m, from 10 m to 100 m, from 100 m to 1 km, from 1 km to 10 km, or other ranges, including smaller scales when implemented on an integrated circuit (e.g., 10 μm, 100 μm, 1000 μm). In some implementations, the plurality of lasers 302, the control system 322 and the plurality of photoreceivers 310, may be collocated (e.g., on board, on a chip, within a single compartment and the like). In some implementations, the plurality of lasers 302, the control system 322 and the plurality of photoreceivers 310, may be integrated on a single chip or single circuit board. In some implementations, the plurality of lasers 302, and the plurality of photoreceivers 310 may be monolithically fabricated on a single or separate chips while the control system 322 may be fabricated on a separate chip.

In some implementations, the output of the first optical link 104a may be connected to a common optical input port 336a that provides the multiplexed optical output to the plurality of RRMs 306. In some examples, the plurality of RRMs 306 may be integrated on a chip 334 (e.g. silicon photonic chip) as a photonic circuit. In these implementations, the plurality of RRMs 306 may be optically coupled to a common bus waveguide 338 in an "all-pass" configuration (as shown in FIG. 3) or an "add-drop" configuration, and the common optical input port 336a can be an input port of the common bus waveguide. Input DATA 308 may comprise a plurality of electronic input signals each provided or applied to an RRM of the plurality of RRMs 306. Each RRM may pick an optical carrier, having a wavelength close to a resonant wavelength of an optical mode the RRM, from the plurality of optical carriers in the multiplexed optical output. Subsequently, the RRM may modulate the optical carrier (e.g., the amplitude of the optical carrier) using an electronic input signal, of the plurality of optical signals included in the multiplexed optical output, applied on the RRM. The modulated optical carrier may be coupled back to the common bus waveguide 338 and exit the common bus waveguide 338 via a common optical output port 336b (e.g., a common optical output of the common waveguide 338). A multiplexed modulated optical output, comprising a plurality of modulated optical carriers, may exit from the common optical output port. The plurality of modulated optical carriers may each be generated by an RRM using an electronic input signal. The multiplexed modulated optical output may be transmitted to a wavelength demultiplexer (DeMux) 332 via a second optical link 104b. The demultiplexer 332 may use the multiplexed modulated optical output to generate a plurality of modulated optical carriers and transmit each modulated optical carrier to a photoreceiver of the plurality of photoreceivers 310.

The photoreceiver 310 may convert the plurality of modulated optical carriers to a plurality of detected electronic signals. A portion of each detected electronic signal may be output as an electronic output signal (output DATA) corresponding to the electronic input signal (input DATA) used to generate the corresponding modulated optical carrier. As in optical communication system 200, a second portion of each detected electronic signal may be used by the control system 322 to generate a control signal configured to control the wavelength of the laser that generates the optical carrier associated with the detected electronic signal. The control system 322 or a subsystem of the control system 322 (e.g., a subsystem similar or identical to the control system 222) may generate the control signal based on methods described with respect to FIG. 2. In some implementations, a plurality of control signals are generated by the control system 322 to reduce fluctuations in the modulation amplitudes of the modulated optical carriers by altering the wavelength of the respective optical carriers. In some implementations, the plurality of control signals generated by the control system 322 may maintain the modulation amplitudes above one or more threshold modulation amplitudes by altering the wavelengths of the respective optical carriers.

Operating Principles of Remote Stabilization Via Laser Wavelength Tuning

As described above RRMs and other resonant EOMs comprise an optical cavity supporting a plurality of optical modes. The optical transmission spectrum of the RRM (also referred to as the optical transfer function of the RRM). In some cases, the optical transmission spectrum may be the optical power transmitted via a coupler or a waveguide coupled to the optical cavity at different optical carrier wavelengths. The optical transmission spectrum (optical transfer function) of the RRM may comprise a plurality of transmission dips corresponding to a plurality of optical modes supported by the optical cavity (herein referred to as optical modes of the RRM). Each optical mode may have a resonant wavelength at which the optical transmission is minimized. Each optical mode may have a spectral shape (also referred to as "line shape") and a full-width-half-maximum (FWHM) that quantifies the spectral width of the optical mode. In some cases, the spectral shape of one or more optical modes of the RMM may be a Lorentzian shape.

When an optical carrier having an optical carrier wavelength close to the resonant wavelength of an optical mode of the RRM is fed to the RRM, the transmitted optical power (also referred to as optical output of the RRM), depends on the difference between the optical carrier wavelength and the resonant wavelength of the optical mode of the RRM. In some cases, the difference between the optical carrier wavelength and the resonant wavelength of an optical mode of the RRM (herein referred to as "wavelength detuning"), may be quantified based on the FWHM of the corresponding optical mode. For example, wavelength detuning may be ±0.1× FWHM, ±0.2×FWHM, ±0.5×FWHM, ±0.7×FWHM, ±1×FWHM, ±2×FWHM, ±3×FWHM or ±4×FWHM. In some examples, a wavelength detuning of an optical carrier with respect to an optical mode of RRM may be between ±0.1×FWHM and ±2×FWHM when the RRM modulates the optical carrier using the optical mode. In some implementations, where a plurality of optical carriers are modulated by a plurality of RRMs (e.g., the optical communication system 300 shown in FIG. 3), each optical carrier may have a wavelength associated with a resonant wavelength of an optical mode of one of the RRMs where the wavelength detuning of the optical carrier is between ±0.1×FWHM and ±2×FWHM.

Figure 4A:
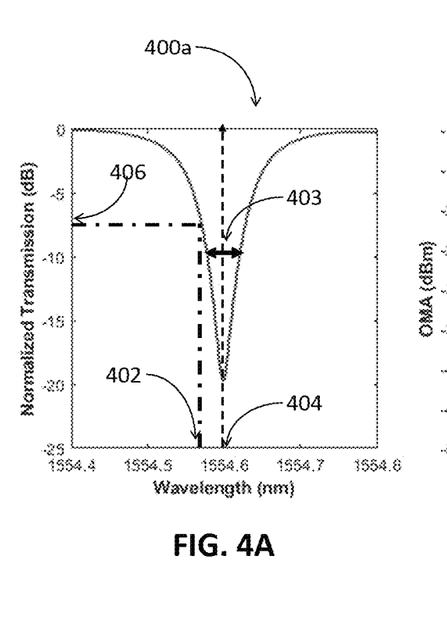
FIG. 4A shows an example of the measured normalized optical transmission of an example RRM near the resonant wavelength of an optical mode of the RRM.

The resonant wavelength of each optical mode of the RRM may be changed, for example via electro-optic effect, by applying an electric or electronic signal (e.g., a voltage) on the RRM. As such, when an optical carrier, having a wavelength close to the resonant wavelength of the optical mode, is fed to an RRM, the optical output of the RRM (the portion of the optical carrier transmitted by the RRM) may be modulated (e.g., amplitude modulated) by applying an electronic or electronic signal on the RRM. As such, a selected optical mode of the plurality of optical modes of an RRM may be used for modulating an optical carrier having a wavelength close to the resonant wavelength of the selected optical mode. The efficiency or sensitivity of the resulting electro-optical modulation may depend on the wavelength deference (in the absence of the electronic input signal) between the resonant wavelength of the optical mode and the wavelength of the optical carrier. FIG. 4A shows an example of a normalized optical transmission spectrum 400a (an optical transfer function) of an RRM (i.e., a Si RRM) near the resonant wavelength 404 of an optical mode of the RRM. In this case the optical transfer function has a Lorentzian spectral shape. The optical transmission spectrum limits the transmitted portion of an optical carrier fed to the RRM based on the wavelength detuning. For example, FIG. 4A illustrates that the magnitude 406 of the optical transmission at an optical carrier wavelength 402 depends on the difference (wavelength detuning) between optical carrier wavelength 402 and resonant optical wavelength 404 of the optical mode. As mentioned above, the wavelength detuning may be quantified by comparing the difference between the optical carrier wavelength 402 and the resonant optical wavelength 404 by the FWHM of the optical mode (the FWHM 403 of the Lorentzian transfer function)

Figure 4B:
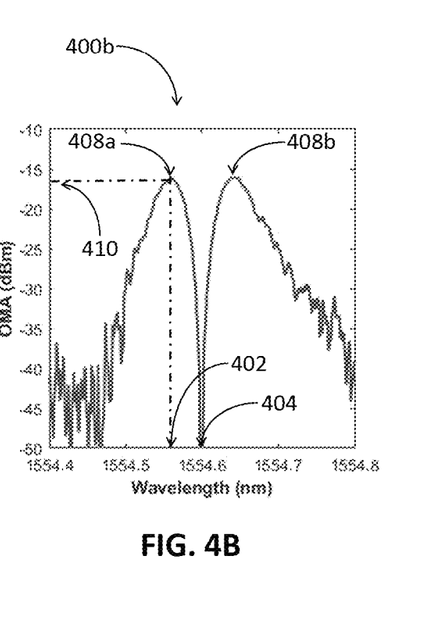
FIG. 4B shows calculated optical modulation amplitude (OMA) of a modulated optical carrier generated by an RRM as the wavelength of the optical carrier is tuned across the optical mode. The OMA is calculated based on the optical mode shown in FIG. 4A.

FIG. 4B shows calculated optical modulation amplitude (OMA) of a modulated optical carrier generated using the optical mode shown in FIG. 4A as the wavelength of the optical carrier is tuned across the optical mode. OMA may be half of a peak-to-peak value of the amplitude of the corresponding modulated optical carrier. The variation of OMA as a function of the optical carrier wavelength shows two peaks 408a and 408b indicating that OMA at two specific optical carrier wavelengths is larger than other optical carrier wavelengths. The first peak value 408a of OMA corresponds to an optical carrier wavelength less than the resonant wavelength of the optical mode and the second peak 408b corresponds to an optical carrier wavelength larger than the resonant wavelength of the optical mode. For example, at optical carrier wavelength 402 the OMA has a peak value 410. As mention above in some cases, the optical transfer function associated with an optical mode of the RRM may have a Lorentzian lineshape. In such cases, the OMA and an average power of the detected electronic signal may vary non-linearly with the optical carrier wavelength.

FIG. 4B indicates that for a selected optical mode of RRM, the wavelength difference between the optical carrier wavelength 402 and the resonant wavelength 404 of the selected, controls the magnitude of the OMA. As such, any change of the resonant wavelength 404 (e.g., random or constant changes due to temperature fluctuations in the environment surrounding the RRM) may result in OMA change (e.g., fluctuations or reduction). The feedback systems and method described above may be used to control optical carrier wavelength to reduce OMA fluctuations. In some examples, the control signal generated by the control system 222 (or control system 322) may change the optical carrier wavelength 402 (by changing the wavelength of the corresponding laser) to maintain the difference between the optical carrier wavelength 402 and the resonant wavelength 404 below a threshold difference. In some other examples, the control signal generated by the control system 222 (or control system 322) may change the optical carrier wavelength 402 to maintain the OMA (e.g., a peak OMA 408a or 408b) above a threshold value or within a target range. In yet other examples, the control signal generated by the control system 222 (or control system 322) may change the optical carrier wavelength 402 to maintain an RF power associated with the OMA (e.g., RF power of a detected electronic signal generated upon detecting the corresponding modulated optical carrier) above a threshold value, within a range from a target OMA, or within a target range. In some examples, the control system 222 (or control system 322) may alter the optical carrier wavelength 402 to maintain the RF power within 5%, 1%, 0.5%, 0.1%, 0.05%, 0.01%, 0.005%, 0.001% or any range formed by any of these values or possibly larger or smaller, from a target RF power. In some other examples, the control system 222 (or control system 322) may alter the optical carrier wavelength 402 to maintain the optical modulation amplitude within 5%, 1%, 0.5%, 0.1%, 0.05%, 0.01%, 0.005%, 0.001% or any range formed by any of these values or possibly larger or smaller, from a target modulation amplitude.

Figure 5A:
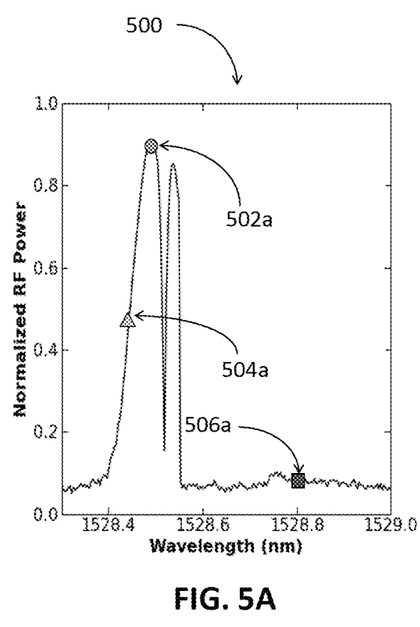
FIG. 5A shows normalized measured RF power of the detected electronic signal associated with a modulated optical carrier, generated by an RRM driven by an electronic input signal associated with input data having a data rate of 2.5 Gbps, as a function of the optical carrier wavelength where the optical carrier wavelength is tuned near an optical mode of the RRM.

FIG. 5A shows measured RF power of the detected electronic signal associated with a modulated optical carrier as a function of the optical carrier wavelength where the optical carrier wavelength is changed near an optical mode of the RRM. The optical carrier is modulated by an RRM driven by an electronic input signal associated with input DATA having a data rate of 2.5 Gbps.

Figure 5B:
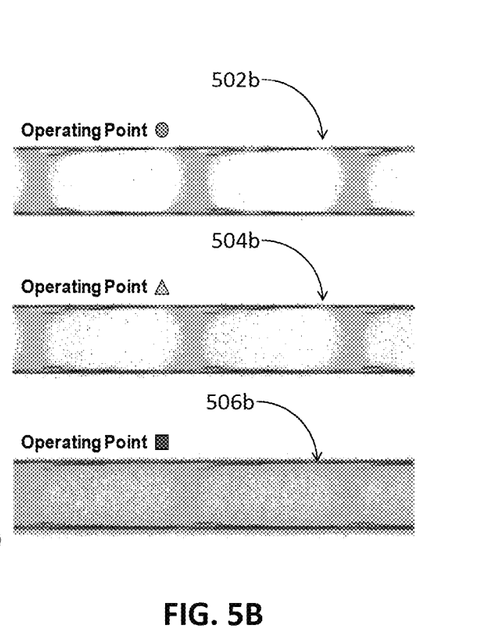
FIG. 5B shows the measured eye diagrams associated with the detected electronic signal of FIG. 5A for three different values of the optical carrier wavelength indicating that selecting the wavelength associated with a peak measured RF power (in FIG. 5A) results in a better performance (a wider and larger eye width).

Two peaks in the wavelength-dependent RF power response 500 are visible, corresponding to the two peaks shown in FIG. 4B. The quality of electronic output signals (output DATA) associated with three different optical carrier wavelengths and corresponding measured detected RF powers 502a, 504a and 506a, has been evaluated by measuring the resulting eye diagrams (as shown in FIG. 5B). The eye diagram 502b corresponds to point 502a, the eye diagram 504b corresponds to point 504a, and the eye diagram 506b corresponds to point 506a. Given that wider and larger eyes (the white regions surrounded by dark lines and regions) indicate a better quality of the output data, these results show that the quality of the modulation is correlated with the RF power of the detected electronic signal. Thus, by periodically measuring the real-time RF power and comparing it to preceding values or a reference value (e.g., a stored reference value or a reference value associated with a reference signal 120), the control system 222 (or the control system 322) may generate control signals that change the optical carrier frequency (laser wavelength) to maintain the RF power within a target range, above a threshold RF power or within a range from a target RF power. In some cases, the control signal may change the optical carrier wavelength to lock the RF power to a peak RF power (for example peak value 502a).

What is claimed is:

1. An optical communication system comprising:
   a wavelength tunable laser configured to generate an optical carrier;
   an electro-optical modulator configured to receive the optical carrier from the wavelength tunable laser, receive an electronic input signal, and generate a modulated optical carrier having a modulation amplitude using the optical carrier and electronic input signal;
   a photoreceiver configured to receive the modulated optical carrier and generate a detected electronic signal associated with the modulation amplitude of the modulated optical carrier; and
   a control system configured to receive the detected electronic signal and generate a control signal based at least in part on an RF power of the detected electronic signal and feed the control signal to the wavelength tunable laser to alter a wavelength of the optical carrier generated by the wavelength tunable laser based on the RF power of the detected electronic signal,
   wherein the control system is configured to alter the wavelength of the optical carrier generated by the wavelength tunable laser to maintain the modulation amplitude above a threshold modulation amplitude, or the electro-optical modulator is in a harsh environment and the wavelength tunable laser and photoreceiver are in an environment isolated from the harsh environment.

2. The optical communication system of claim 1, wherein the electro-optical modulator comprises an optically resonant electro-optical modulator.

3. The optical communication system of claim 2, wherein the optically resonant electro-optical modulator comprises a ring resonator modulator (RRM).

4. The optical communication system of claim 1, wherein the control signal is configured to alter the wavelength of the optical carrier generated by the wavelength tunable laser to maintain the RF power of the detected electronic signal above a threshold RF power.

5. The optical communication system of claim 1, wherein the control signal is configured to alter the wavelength of the optical carrier generated by the wavelength tunable laser to maintain the RF power to within a tolerance of a target RF power.

6. The optical communication system of claim 1, wherein the control system comprises a signal processing system and a monitoring circuit.

7. The optical communication system of claim 6, wherein the signal processing system comprises an analog-to-digital converter configured to digitize the detected electronic signal and a decision logic circuit configured to generate the control signal based at least in part on the digitized detected electronic signal.

8. The optical communication system of claim 1, further comprising:
a first optical link configured to transmit the optical carrier from the wavelength tunable laser to the electro-optical modulator, and
a second optical link configured to transmit the modulated optical carrier from the electro-optical modulator to the photoreceiver.

9. The optical communication system of claim 8, wherein at least one of the first optical link and the second optical link comprise optical fiber links.

10. The optical communication system of claim 1, wherein the wavelength tunable laser, and the photoreceiver are separated from the electro-optical modulator by a distance in a range from 0.1 meter to 10 kilometers.

11. The optical communication system of claim 1, wherein the control signal is configured to reduce fluctuation of the modulation amplitude by altering the wavelength of the optical carrier generated by the wavelength tunable laser.

12. The optical communication system of claim 1, wherein the electro-optical modulator is in a harsh environment and the wavelength tunable laser and photoreceiver are placed in an environment isolated from the harsh environment.

13. A method of controlling an optical communication system comprising:
by a wavelength tunable laser generating an optical carrier;
by an electro-optical modulator:
receiving the optical carrier from the wavelength tunable laser,
receiving an electronic input signal, and
generating a modulated optical carrier having a modulation amplitude using the optical carrier and electronic input signal;
by a photoreceiver receiving the modulated optical carrier and generating a detected electronic signal associated with the modulation amplitude of the modulated optical carrier; and
by a control system receiving the detected electronic signal and generating a control signal based at least in part on an RF power of the detected electronic signal and feeding the control signal to the wavelength tunable laser to alter a wavelength of the optical carrier generated by the wavelength tunable laser based on the RF power of the detected electronic signal,
wherein altering the wavelength of the optical carrier maintains the modulation amplitude above a threshold modulation amplitude, or the electro-optical modulator is in a harsh environment and the wavelength tunable laser and photoreceiver are in an environment isolated from the harsh environment.

14. The method of claim 13, wherein the electro-optical modulator comprises an optically resonant electro-optical modulator.

15. The method of claim 14, wherein the optically resonant electro-optical modulator comprises a ring resonator modulator (RRM).

16. The method of claim 13, wherein the control signal is configured to alter the wavelength of the optical carrier generated by the wavelength tunable laser to maintain the RF power of the detected electronic signal above a threshold RF power.

17. The method of claim 13, wherein the control signal is configured to alter the wavelength of the optical carrier generated by the wavelength tunable laser to maintain the RF power to within a tolerance of a target RF power.

18. The method of claim 13, wherein the wavelength tunable laser, and the photoreceiver are separated from the electro-optical modulator by a distance in a range from 0.1 meter to 10 kilometers.

19. The method of claim 13, wherein altering the wavelength of the optical carrier maintains the modulation amplitude above a threshold modulation amplitude.

20. The method of claim 13, wherein the electro-optical modulator is in a harsh environment and the wavelength tunable laser and photoreceiver are in an environment isolated from the harsh environment.

21. A control system comprising:
an input configured to receive a detected electronic signal from a photodetector,
an electronic circuit configured to process the detected electronic signal to generate a control signal based at least in part on an RF power of the detected electronic signal, and
an output configured to output the control signal;
wherein the control signal is configured to control a wavelength tunable laser to alter a wavelength of an optical carrier generated by the wavelength tunable laser based at least in part on the RF power of the detected electronic signal,
wherein the control system is configured to alter the wavelength of the optical carrier generated by the wavelength tunable laser to maintain a modulation amplitude of the optical carrier above a threshold modulation amplitude.

22. The optical communication system of claim 1, wherein the control system is configured to alter a wavelength of the optical carrier generated by the wavelength tunable laser to maintain the modulation amplitude above a threshold modulation amplitude.

* * * * *